Oct. 11, 1966  W. E. ARNOLD  3,278,822
INPUT SIGNAL SENSING APPARATUS
Filed Oct. 31, 1963  2 Sheets-Sheet 1
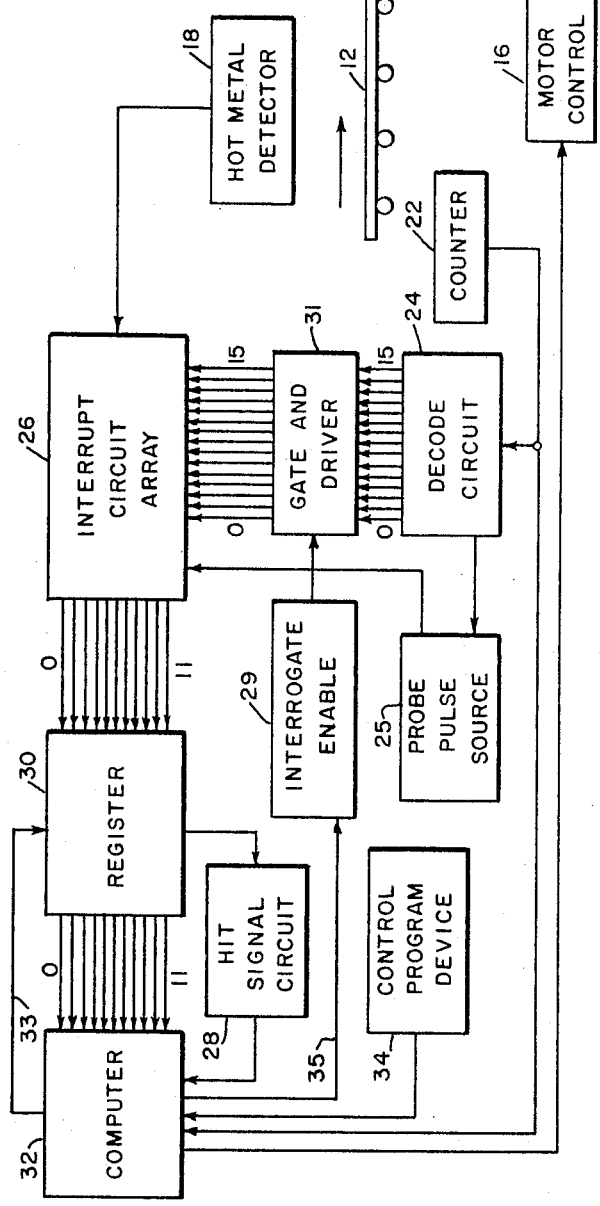
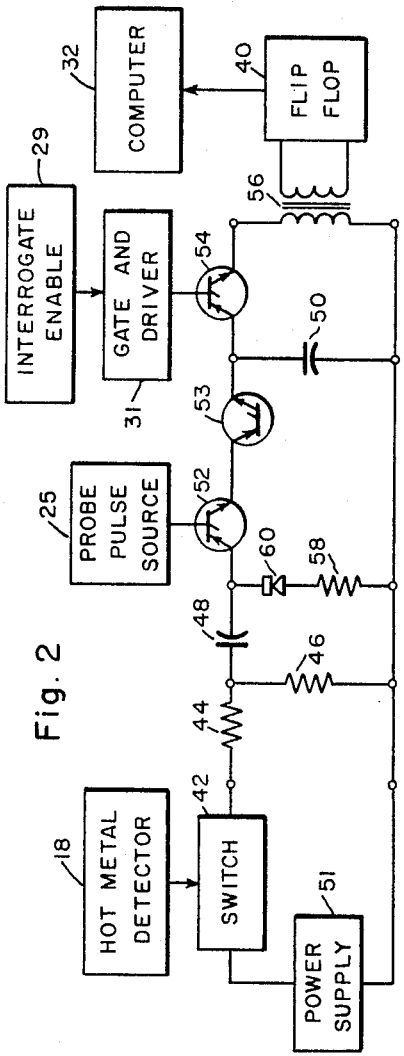
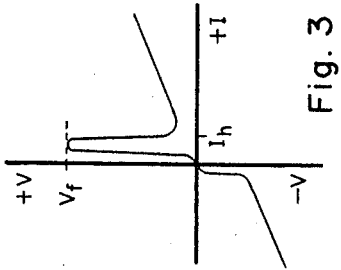
WITNESSES
Leon J. Taza
James F. Young
INVENTOR
Wayne E. Arnold
BY P.M. Brodahl
ATTORNEY

United States Patent Office 3,278,822
Patented Oct. 11, 1966

3,278,822
INPUT SIGNAL SENSING APPARATUS
Wayne E. Arnold, Murrysville, Pa., assignor to Westinghouse Electric Corporation, Pittsburgh, Pa., a corporation of Pennsylvania
Filed Oct. 31, 1963, Ser. No. 320,408
3 Claims. (Cl. 320—1)

This invention relates in general to input signal sensing apparatus, and more particularly to input signal sensing apparatus operative to interrupt the programming operation of a computer upon the occurrence of some external event indicated by the provision of an input signal for which it is desired that the otherwise and normally programmed computer operation should be interrupted.

For example, when a computer is coupled to control a machine such as a steel rolling mill or the like, the programmed operation of the computer at a given time might be to determine the next pass screw down setting for the rolling mill for a succeeding workpiece. The occurrence of an output signal from a workpiece sensing hot metal detector, to signify the presence of a preceding workpiece about to enter a particular stand of the rolling mill, might be desired to interrupt this next pass screw down setting calculation by the computer and instead cause the computer to control the motor speed for that particular stand, such that the speed of the rolls thereof will be appropriate for the entrance of this preceding workpiece.

It is already known in the prior art to employ transistor switching circuits to interrupt the programmed operation of a computer. The latter prior art circuits have not provided adequate rejection of noise signals and have not adequately isolated the computer from undesired disturbances that could result in malfunctions of the computer itself. In addition, serious damage to other coupled peripheral circuitry and devices has resulted from the use of transistor switching circuitry for this purpose due to the lack of adequate isolation therefor.

It is an object of the present invention to provide an improved input signal interrupting circuit for a computer such that the desired isolation is presented between the computer and peripheral controlling devices and in addition better transfer is effected for input signals from those peripheral devices for the interruption of the computer, which signals can be in the order of a few milliseconds up to substantially continuous in duration.

It is an additional object to provide improved operation interrupting circuit means that is less expensive and better operative with a computer to permit only one interruption for each appropriate interrupt input signal and to better synchronize the interruption of the computer by the respective input signals to prevent undesired interference between them.

It is a further object of the present invention to provide a better storage of input signal information that a peripheral device has called for the interrupt of the computer until this information can be transferred into the computer to effect the desired interruption thereof.

These and other objects of the present invention are accomplished by an input signal sensing circuit operative with a computer or the like and including a storage capacitor circuit which is charged upon the simultaneous occurrence of a probe pulse and the closure of an external contact or the like to signify a suitable interrupt input signal, and including a switching device responsive to an interrogate pulse and operative otherwise to prevent the application of the charge voltage stored in the capacitor circuit to effect a change of state in an associated flip-flop or the like, which signal sensing circuit is operative to prevent multiple interrupts of the computer operation.

The various features of the present invention will better be understood with reference to the accompanying drawings wherein:

FIGURE 1 is a diagrammatic showing of control apparatus in accordance with the teachings of the present invention.

FIGURE 2 is a schematic showing of the computer interruption control circuit of the present invention.

FIGURE 3 is a curve illustrating the operation of the four-layer diode shown in FIGURE 2.

Figure 4:
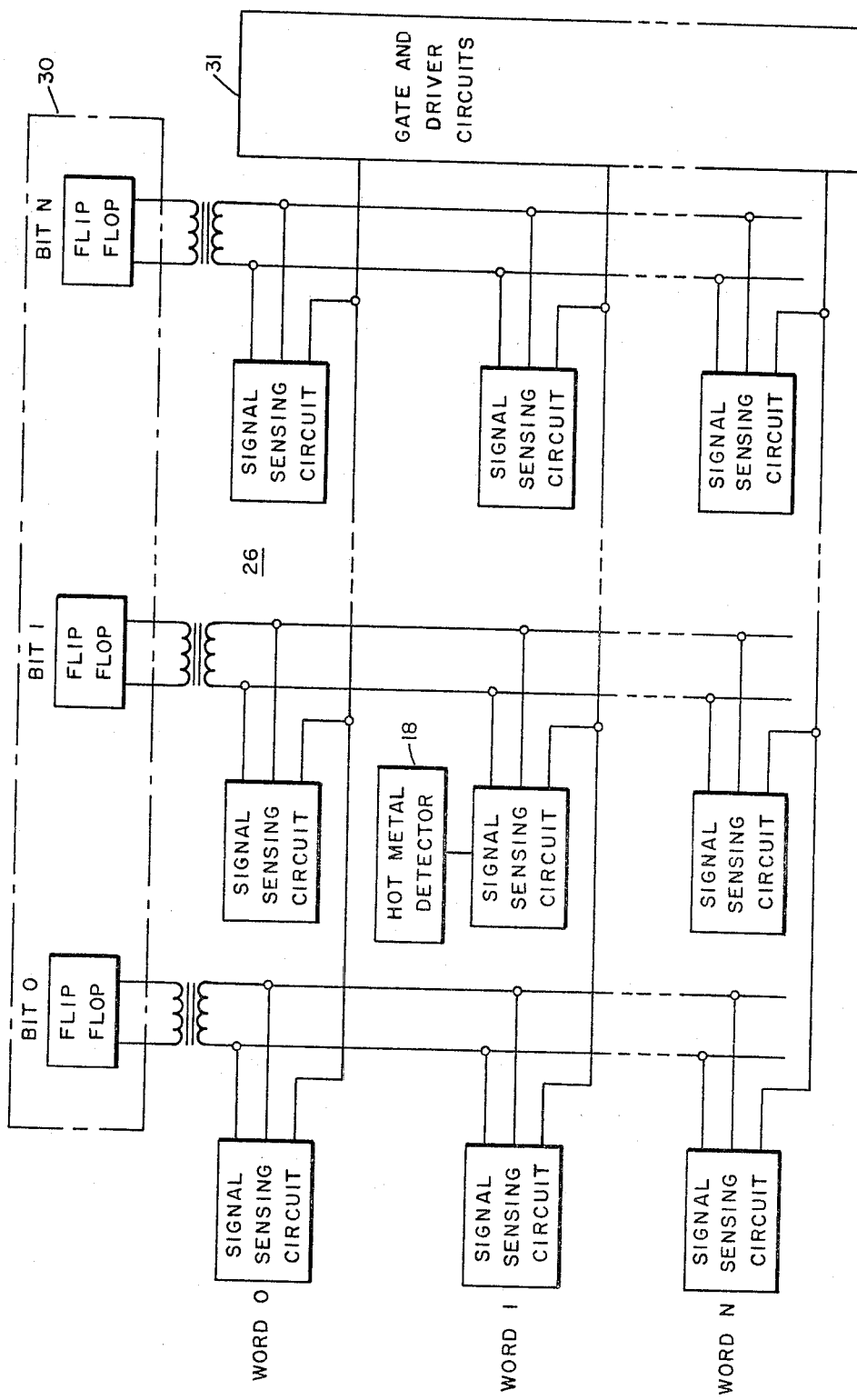
FIGURE 4 is a diagrammatic showing of a signal sensing circuit array operative to interrupt the computer operation.

In FIGURE 1 there is shown a rolling mill stand 10 operative to receive a workpiece 12 travelling as indicated in a direction toward the rolling mill stand 10. A motor 14 is operative to drive the rolls of the mill stand 10 as determined by a conventional motor control 16. A hot metal detector 18 is operative to sense the presence of the workpiece 12 and to provide a computer interrupt input signal to the interrupt circuit array 26. A counter 22, which is free running and operative to count through 0 to 15 in binary form in approximately ½ millisecond, provides output signals to a decode circuit 24, which receives the binary output signals from the counter 22 and decodes this information into sixteen interrogate signals, which are successively fed to the interrupt circuit array 26. In this regard, the sixteen signals from the decode circuit 24 are operative to energize the respective signal sensing circuits in the provided interrupt circuit array 26 which is arranged with sixteen word rows of signal sensing circuits, each row having columns of such circuits, such that the rows correspond to the words and the columns correspond to the word bits. Thusly, particular bit signal sensing circuits of the interrupt circuit array 26 are energized to change the respective operative status of associated flip-flops to indicate the application of interrupt input signals. One of such input signal from a hot metal detector 18 may be supplied to a signal sensing circuit as shown in FIGURE 4 in word row one and bit column one and others of such signals can be from a plurality of other and similar interrupt signal sources. The respective interrupt signals from the interrupt circuit array 26 are supplied to the interrupt input data register 30 which includes 12 bistable flip-flop circuits, to signal an interrupt operation to the computer. The interrupt input data register 30 is operative with the computer 32, normally operative with a control program device 34, to interrupt its operation by an interrupt signal from the input data register 30 for the purpose of controlling the motor 14 as will be later described.

When an interrupt signal is present in the interrupt input data register 30, a hit signal circuit 28 is energized to notify the computer 32 that an interrupt signal is to be sensed. The computer 32 now reads the counter level to identify the word priority of the interrupt signal stored in the interrupt input data register 30 and sends a signal through conductor 35 to remove the enable signal supplied by the interrogate enable circuit 29 to thereby block the gate and driver circuit 31. If the priority of the already and currently programmed operation of the computer 32 is lower than that of the now available interrupt input signal to be sensed and in the interrupt input data register 30, the computer 32 will respond to this interrupt input signal and then send a signal through a connection 33 to clear the interrupt input data register 30. The computer again allows the interrogate enable circuit 29 to open the gate and driver circuit 31 after the counter 22 has returned to its zero and highest priority word count level. Thusly, if the above interrupt input signal was stored in the interrupt circuit array 26 in the one word row of circuits, the counter 22 would return the interrogate operation to the highest priority zero word row of circuits after the computer had processed the one or more interrupt signals stored in the input data register in the event that a higher priority interrupt signal was now present in the interrupt circuit array 26.

In FIGURE 2 there is shown an interrupt signal circuit such as provided in the interrupt circuit array 26 and operative with a flip-flop 40 and pulse transformer 56, which transformer and flip-flop provides the desired computer input signal isolation and interrupt signal memory function required of the circuit shown in FIGURE 2. The flip-flop 40 is within the register 30 and has two stable states of operation which are respectively one and zero operation as is well known. An interrupt input signal is applied when the hot metal detector 18 senses a hot workpiece and causes switch 42 to close and thereby apply an interrupt input signal to the voltage divider circuit including resistor 44 and resistor 46. Prior to this time the capacitors 48 and 50 were discharged and they remain in this condition when the latter interrupt signal is so applied. The probe pulse source 25 periodically provides a probe pulse at a time between the 15 and 0 count level of the counter 22, when none of the interrupt circuits in the array 26 are being interrogated. This probe pulse is applied to the control gate electrode of the controlled rectifier 52 turning it on to become conductive and causing the capacitor 48 to be charged to a voltage in the order of 30 volts in a period of about 1.5 milliseconds as determined by the charging circuit arrangement including the resistors 44 and 46 and the 48 volts of the D.C. power supply 51. The probe pulse is provided once every ½ millisecond. The capacitor 50 is also charged at this time through the breakdown of the four-layer switching diode 53, commonly known as a Shockley diode. When capacitor 48 and the capacitor 50 become charged in this manner, the controlled rectifier 52 and the four-layer diode 53 will turn off.

The operating characteristic of the four-layer diode 52 is well known and is shown in FIGURE 3. It is such that the diode supports voltage in the forward direction until the breakdown firing voltage $V_f$ of about 30 volts is reached, at which point the diode suddenly becomes fully conducting except for a forward drop of about one volt. If the current through the diode is reduced below the holding current $I_h$, the diode recovers and again supports the voltage in the forward direction. The characteristic in the reverse direction is similar to that of a normal silicon diode.

A read or interrogate pulse is now applied to the control gate electrode of the controlled rectifier 54 to cause the capacitor 50 to discharge through the pulse transformer 56 to set the flip-flop 40 to indicate the presence of an interrupt input signal for the computer 32. The flip-flop 40 is within the register 30 shown in FIGURE 1.

The next probe pulse from the probe pulse source 25 will allow the controlled rectifier 52 to turn on again, but the charge voltage across the capacitor 48 will now subtract from the voltage drop across resistor 46 such that the resultant voltage will not be sufficient to break down the four-layer diode 53. Therefore, the capacitor 50 will not again be charged as previously described, and the next and subsequent interrogate pulse applied to the controlled rectifier 54 will not result in another current flow through the pulse transformer 56.

After the signal from the hot metal detector 18 is removed to open the switch 42, which could comprise a relay switch, the voltage across the capacitor 48 will now discharge through a path including resistor 46, the resistor 58, and the diode 60.

The above described sequence of operations will again be repeated for the next closing of the switch 42. The probe pulse source 25 periodically provides a probe pulse at a time between the 15 and 0 count level of counter 22 when none of the interrupt input circuits are being interrogated to cause a probe pulse to fire and make conductive the controlled rectifier 52 shown in FIGURE 2. The voltage drop across resistor 46 is greater than the switching voltage of the four-layer diode, 53, such that the capacitors 48 and 50 now charge through path including capacitor 48, the conductive controlled rectifier 52, the four-layer diode 53 and the capacitor 50. Thus the circuit shown in FIGURE 2 will sense a closing of the switch 42. When the interrogate signal is supplied to make conductive the controlled rectifier 54, the capacitor 50 discharges through the pulse transformer 56. The capacitor 48 remains charged to a time period long enough to not respond to any undesired bounces of the contacts within the input signal switch 42.

FIGURE 4 illustrates how a plurality of the input signal sensing circuits, such as shown in FIGURE 2, are connected to provide a matrix, with each being operative at a predetermined priority level to determine an interruption of the otherwise programmed operation of the computer. In the example shown in FIGURE 4, the bit zero flip-flop could be the highest priority interrupt flip-flop in the register 30, with the next order of priority being the bit one flip-flop, and so forth to the lowest priority level flip-flop.

The resistors 44 and 46 and the capacitor 48 provide a filtering of applied input signals in addition to their other functions. The filter time constant is chosen to be sufficient to prevent most noise spikes from causing interrupt operation relative to the computer. The pulse transformer 56 and flip-flop are inherently insensitive to noise because of the large current required for switching.

Multiple inputs such as could be caused by relay contact bounce are found to be no problem, when used for interrupt inputs. If the switch 42 comprised a relay contact that bounces open again after the four-layer diode 53 has fired, the time constant with which capacitor 48 discharges has been made sufficiently long that it retains enough voltage to prevent refiring of the four-layer diode 53 when the contact of switch 42 bounces to close again.

The interrupt circuit array 26 shown in FIGURE 1 includes a two dimensional matrix arrangement of input signal sensing circuits as shown in FIGURE 4. The column are the bits, and the corresponding bits of each word are in series such that the same bits of all words are interrogated at one time. The rows are the words. After all of the input signal sensing circuits are simultaneously probed by the probe pulse source 25 to charge the capacitor 50 shown in FIGURE 2 for the respective circuits where there have been input signal contact closures, the corresponding rows of word bits are interrogated one at a time in their level of priority into the input data register 30 as shown in FIGURE 4. Any signal sensing circuit that has been set by an interrupt input signal will have an output signal from its pulse transformer when the word bit column containing it is interrogated. This pulse transformer signal sets a flip-flop in the interrupt input register 30 shown in FIGURE 1 to cause an interrupt in the operation of the computer 32 and to prevent any further interrogation of the cores until the interrupt register 30 is read into the computer through an input channel. Provision is made for the probe pulse source 25 to continue operating during this process of taking an interrupt into the computer. If more than one signal sensing circuit in a word has been so set before the word has been interrogated, all the set bits of that word will be taken into the interrupt input register 30 and the computer in parallel at the same time.

In reference to FIGURE 4 an interrogate enable signal is supplied to gate and driver circuits 31 to enable the decoded counter signals to interrogate the windings of the respective word bit rows of the circuit array 26 as shown in FIGURE 4. Any of the 12 bit circuits in a given word row storing an input interrupt signal will be switched thereby to its state of operation by the interrogate pulse to result in an output signal being supplied through its pulse transformer such as shown in FIGURE 2.

Thusly, it will be seen that the interrupt control circuit as seen in FIGURE 2 is operative to isolate the computer as provided by the pulse transformer 56 and the controlled rectifiers 52 and 54. The capacitor 48 is operative to allow only one interrupt regardless of the length of time that the contact switch 42 is closed. A probe pulse from the probe pulse source 25 synchronizes the time in which the signal sensing circuit can be set to thereby prevent interference with the interrogating of the other signal sensing circuits. Any given signal sensing circuit shown in FIGURE 4 is operative to store the information that a peripheral device has called for an interrupt of the computer until this information is transferred into the interrupt input register 30 shown in FIGURE 1. The interrupt input signal sensing circuit is able to receive the next successive interrupt input signal after the capacitors 48 and 50 have been discharged from the previous interrupt input signal. The input filter and inherent noise rejecting properties of the circuit are sufficient to prevent most noise signals from causing undesired interrupts of the computer.

It should be understood that the computer 32 shown in FIGURE 1 includes its own priority director to determine if a normally programmed operation of the computer should continue when any given interrupt input signal is received. If a higher priority interrupt input signal is received, the programmed computer operation will be interrupted. However, if the programmed operation of the computer has a higher priority than the particular interrupt input signal, the computer 32 will continue its programmed operation until a lower priority programmed operation of the computer 32 occurs such that the now higher priority interrupt input signal will interrupt the computer operation.

It should be understood that the hot metal detector 18 shown in FIGURE 1 is operative with only the signal sensing circuit of a particular bit of a particular word in the interrupt circuit array 26, and is described for purpose of example. Other interrupt signals, such as to indicate a circuit breaker tripping to show an overload condition or the like, will be similarly provided to other interrupt circuits of the array and be of perhaps higher or lower priority as may be desired.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. Apparatus for providing an output signal to interrupt an associated computer in response to the occurrence of an input signal and the provision of a first probe signal followed by a second interrogate signal, including voltage supply means responsive to said input signal to provide a predetermined voltage signal, voltage storage means, first circuit control means including a first switch member responsive to said first probe signal and a predetermined voltage breakdown device serially connected with said voltage storage means and operative to be conductive to control the storage of said voltage signal by said voltage storage means when the first probe signal is provided, and second circuit control means responsive to said second interrogate signal and cooperative with said voltage storage means to provide said output signal when the second interrogate signal is provided, with said predetermined voltage breakdown device being operative not to be conductive while the second interrogate signal is provided.

2. Apparatus for providing a single output signal in response to the occurrence of an input signal and the provision of both a first control signal and a second control signal, including voltage supply means responsive to the occurrence of said input signal to provide a predetermined voltage signal, first voltage storage means and second voltage storage means, first circuit control means including a voltage breakdown device serially connected between the first and second voltage storage means and being responsive to said first control signal to control the storage of said voltage signal by said first voltage storage means and said second voltage storage means when the first control signal is provided, and second circuit control means operative with said second voltage storage means to provide said single output signal in response to the second control signal being provided, with said voltage breakdown device being operative to be conductive in response to said voltage signal while the first control signal is provided and not to be conductive while the second control signal is provided.

3. Apparatus for providing an output signal in response to the occurrence of an input signal and the provision of a first control signal followed by a second control signal, including voltage supply means responsive to said input signal to provide a predetermined voltage signal, first voltage storage means and second voltage storage means, first circuit control means including a controlled rectifier which becomes conductive in response to said first control signal to control the storage of said voltage signal by said first voltage storage means and said second voltage storage means when the first control signal is applied to said controlled rectifier, second circuit control means including a second controlled rectifier cooperative with at least said second voltage storage means to control the provision of said output signal when the second control signal is provided, and a four-layer voltage switching diode serially connected between the first and second voltage storage means and operative to be conductive in response to a predetermined breakdown voltage while the first control signal is provided and not to be conductive while the second control signal is provided.

References Cited by the Examiner

UNITED STATES PATENTS 2,428,390  9/1947  Smith _____ 320—1

BERNARD KONICK, *Primary Examiner.*

IRVING SRAGOW, *Examiner.*

G. LIEBERSTEIN, *Assistant Examiner.*